(12) United States Patent
Blondelet et al.

(10) Patent No.: US 10,137,589 B2
(45) Date of Patent: Nov. 27, 2018

(54) MACHINE AND METHOD FOR REDUCING PARTS OF TIRES TO PIECES AT THE END OF LIFE

(71) Applicants: COMPAGNIE GENERALE DES ETABLISSMENTS MICHELIN, Clermont-Ferrand (FR); MICHELIN RECHERCHE ET TECHNIQUE, S.A., Granges-Paccot (CH)

(72) Inventors: Michel Blondelet, Clermont-ferrand (FR); Alberto Mattarozzi, Clermont-ferrand (FR); Andre Pallotta, Clermont-ferrand (FR); Patrick Rene, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 644 days.

(21) Appl. No.: 14/443,801

(22) PCT Filed: Nov. 19, 2013

(86) PCT No.: PCT/EP2013/074197
§ 371 (c)(1),
(2) Date: May 19, 2015

(87) PCT Pub. No.: WO2014/076310
PCT Pub. Date: May 22, 2014

(65) Prior Publication Data
US 2015/0298332 A1    Oct. 22, 2015

(30) Foreign Application Priority Data
Nov. 19, 2012 (FR) ...................... 12 60956

(51) Int. Cl.
*B62D 3/00* (2006.01)
*B26D 3/00* (2006.01)
(Continued)

(52) U.S. Cl.
CPC ............... *B26D 3/005* (2013.01); *B26D 1/09* (2013.01); *B26D 3/00* (2013.01); *B26D 5/04* (2013.01);
(Continued)

(58) Field of Classification Search
CPC . B26D 3/005; B26D 5/04; B26D 7/01; B26D 7/06; B26D 3/00; B26D 3/009
(Continued)

(56) References Cited

U.S. PATENT DOCUMENTS

| 5,531,146 A | 7/1996 | Pederson |
| 5,671,892 A * | 9/1997 | Morikawa ............... B23D 17/00 |
| | | 241/101.73 |
| 8,621,968 B1 * | 1/2014 | Pederson .................. B26D 1/30 |
| | | 83/410.9 |

FOREIGN PATENT DOCUMENTS

| EA | 023448 B1 * 11/2013 |
| WO | 2012141613    10/2012 |
| WO | WO 2012141613 A2 * 10/2012 ............. B62D 3/005 |

OTHER PUBLICATIONS

International Search Report for PCT/EP2013/074197 dated Feb. 17, 2014.

* cited by examiner

*Primary Examiner* — Kenneth E. Peterson
*Assistant Examiner* — Nhat Chieu Do
(74) *Attorney, Agent, or Firm* — Dickinson Wright PLLC

(57) ABSTRACT

The machine for breaking a part of a tire down into pieces includes a frame and a tire support which is adapted to support a part of the tire. The machine also has a supplying (Continued)

device which is configured to feed the part of the tire to a cutting station which includes a cutting device. The cutting device has a first blade and a second blade that are pivotable with respect to one another at a fulcrum. At least one of the first and second blades has a concave shape and cooperates with the other blade to keep the part of the tire inside of the blades. The supplying device includes a movable unit which can pivot about a vertical axis between first and second positions.

13 Claims, 9 Drawing Sheets

(51) Int. Cl.
  *B26D 1/09* (2006.01)
  *B26D 5/04* (2006.01)
  *B26D 7/06* (2006.01)
  *B26D 7/01* (2006.01)
  *B26D 1/00* (2006.01)
(52) U.S. Cl.
  CPC ................ *B26D 7/01* (2013.01); *B26D 7/06* (2013.01); *B26D 2001/0066* (2013.01); *B26D 2007/013* (2013.01)
(58) Field of Classification Search
  USPC .................... 241/264, 266, 101.73; 83/694
  See application file for complete search history.

MACHINE AND METHOD FOR REDUCING PARTS OF TIRES TO PIECES AT THE END OF LIFE

This application is a 371 national phase entry of PCT/EP2013/074197, filed 19 Nov. 2013, which claims benefit of French Patent Application No. 1260956, filed 19 Nov. 2012, the entire contents of which are incorporated herein by reference for all purposes.

BACKGROUND

1. Field

The present disclosure relates to a machine and a method for breaking parts of tires down into pieces at the end of life, in particular heavy duty tires of large size, of the type of construction plant tires used on earth-moving machines or in mining operations.

2. Description of Related Art

The machine and method are used in the technical sector of recycling tires at the end of life. The term "heavy duty tires" should be understood as meaning tires having a particularly large (rim) diameter, such as 57" and 63" tires, for example.

A need that is particularly desired, in particular in the field of heavy duty tires, is to be able to break a tire part (for example one of the two sidewalls or the cap itself) down into pieces in order to make their subsequent disposal easier.

Documents which describe devices for breaking down tires of medium and large sizes are known from the prior art. Thus, the document U.S. Pat. No. 5,531,146 discloses shears having pivoting blades cooperating with a tire support device. However, the cutting of the tire that is realized with this device starts in the vicinity of the hinge, thereby requiring the arrangement of lateral holding means for the tire during cutting.

The same goes for the device described in the document WO 2012/141613, wherein the tire is held at its center.

SUMMARY

The aim of embodiments of the present invention is to remedy the drawbacks of the abovementioned documents and to provide an original solution for dealing with these needs and to propose an original machine for cutting off the sidewalls or the cap of a tire and a method for cutting off the sidewalls or the cap of a tire.

Another object of an embodiment of the present invention is to make available a machine for cutting off sidewalls or the cap which is easily adaptable to processing tires of various sizes.

In accordance with an embodiment of the invention, this aim is achieved by a machine for cutting off the sidewalls or the cap, which is the subject of the invention, comprising, in combination:
  a frame;
  support means for supporting said part of the tire;
  means for supplying said part of the tire, said means being configured to feed said part to a cutting station;
  cutting means, disposed at said cutting station, for cutting said part so as to break it down into pieces, the cutting means comprising a first blade and a second blade that are pivotable in a hinged manner with respect to one another at a fulcrum and cooperate so as to form shears, said first blade and second blade being shaped such that the cutting of said part of the tire starts at a distal end part of the blades with respect to the fulcrum.

Thus, the blades of the shears that form the cutting means of the invention are shaped such that cutting starts at the distal end of the blades of the shears, away from their pivoting fulcrum. The blades are realized such that at least one has a concave or recessed shape and cooperates with the other blade, which has a substantially planar or likewise recessed shape in order to keep the tire part to be cut inside the blades. When the blades of the shears are closed, this makes it possible to clamp the tire part to be cut inside the shears during cutting. Thus, the tire part is broken down without requiring additional means for laterally holding the tire parts.

The invention, in an embodiment, also relates to a method for breaking a part of a tire down into pieces, said part being formed by a sidewall or a cap of the tire, comprising the steps of:
  disposing said part of the tire in a manner resting against support means;
  supplying cutting means with parts of the tire resting against the support means;
  cutting said part of the tire with the aid of said cutting means in order to break said part of the tire down into pieces, in which said cutting step comprises a step of relative movement of a first blade that is pivotable in a hinged manner with respect to a second blade at a fulcrum and cooperates with said second blade so as to define shears, the blades of which are shaped so as to start cutting at a distal end part of the blades with respect to the fulcrum.

BRIEF DESCRIPTION OF DRAWINGS

According to the abovementioned objectives, the additional technical features of embodiments of the invention are clearly verifiable from the content of the secondary claims mentioned below and the advantages thereof will become even more apparent from the following detailed description which is given with reference to the attached drawings, which show an embodiment that serves purely as an example and is not limiting, and in which:

DETAILED DESCRIPTION OF SPECIFIC EMBODIMENTS

Figure 1:
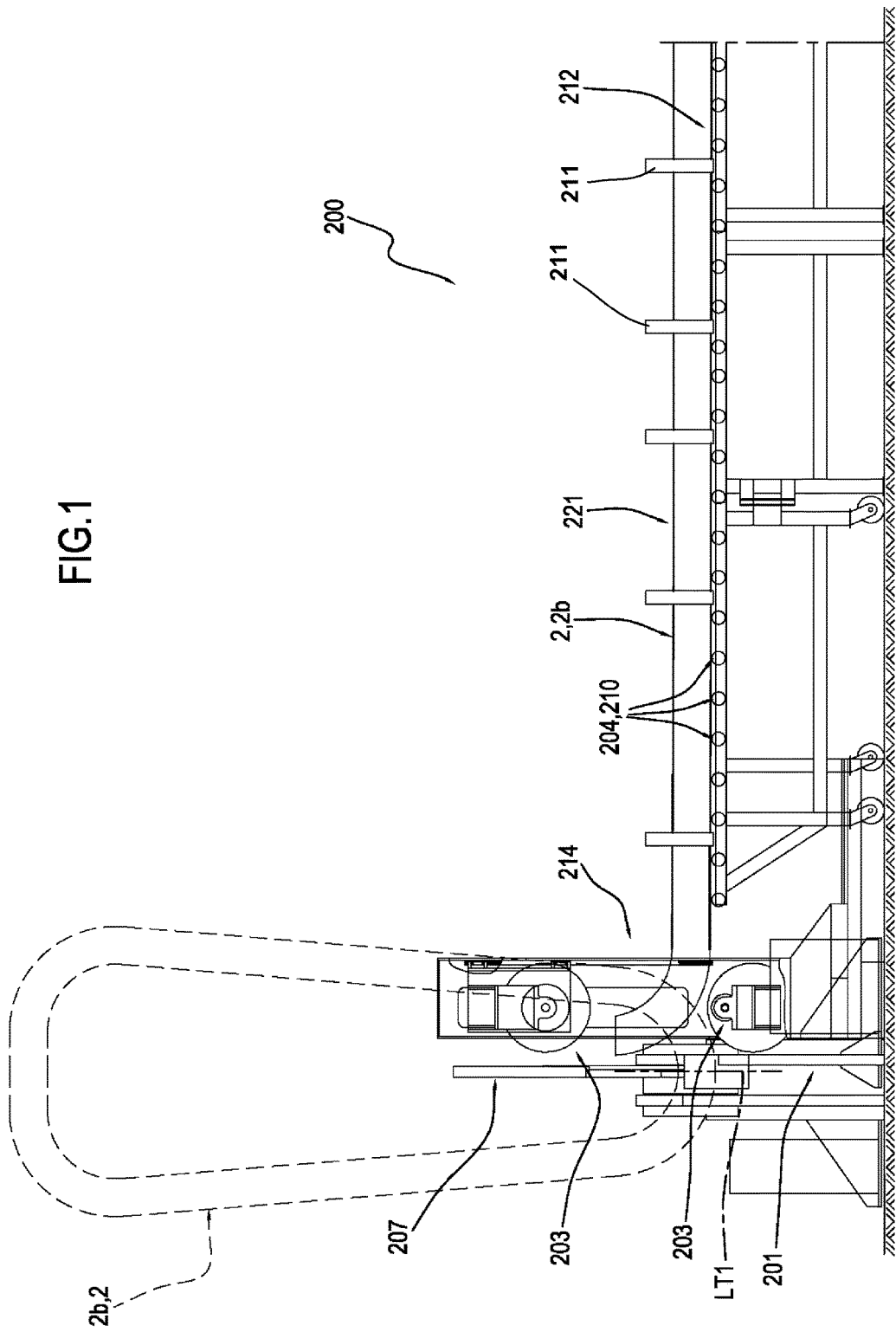
FIG. 1 illustrates a side view of a machine that is the subject of an embodiment of the present invention.

In accordance with the attached drawings, a piece of equipment or a machine for breaking a part (2a, 2b, 2c) of a tire 2 down into pieces 25 is designated 200.

In particular, in the present description, the term "part" (2a, 2b, 2c) of a tire 2 is understood to mean a sidewall (2a, 2c) thereof or the cap 2b of the tire.

The expression "breaking down into pieces" is understood to mean breaking the part down into pieces having smaller dimensions during treatment in the machine 200.

Figure 3:
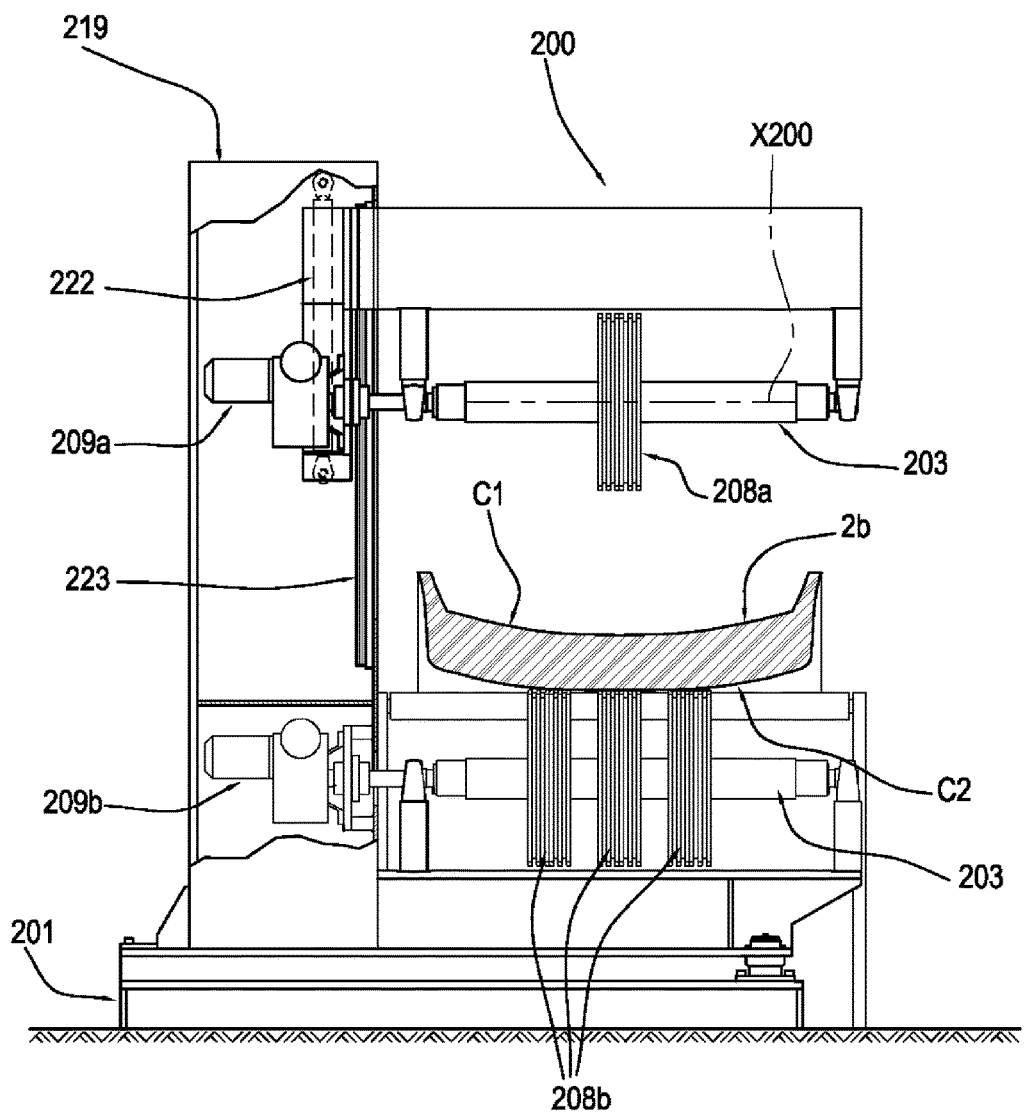
Figure 4:
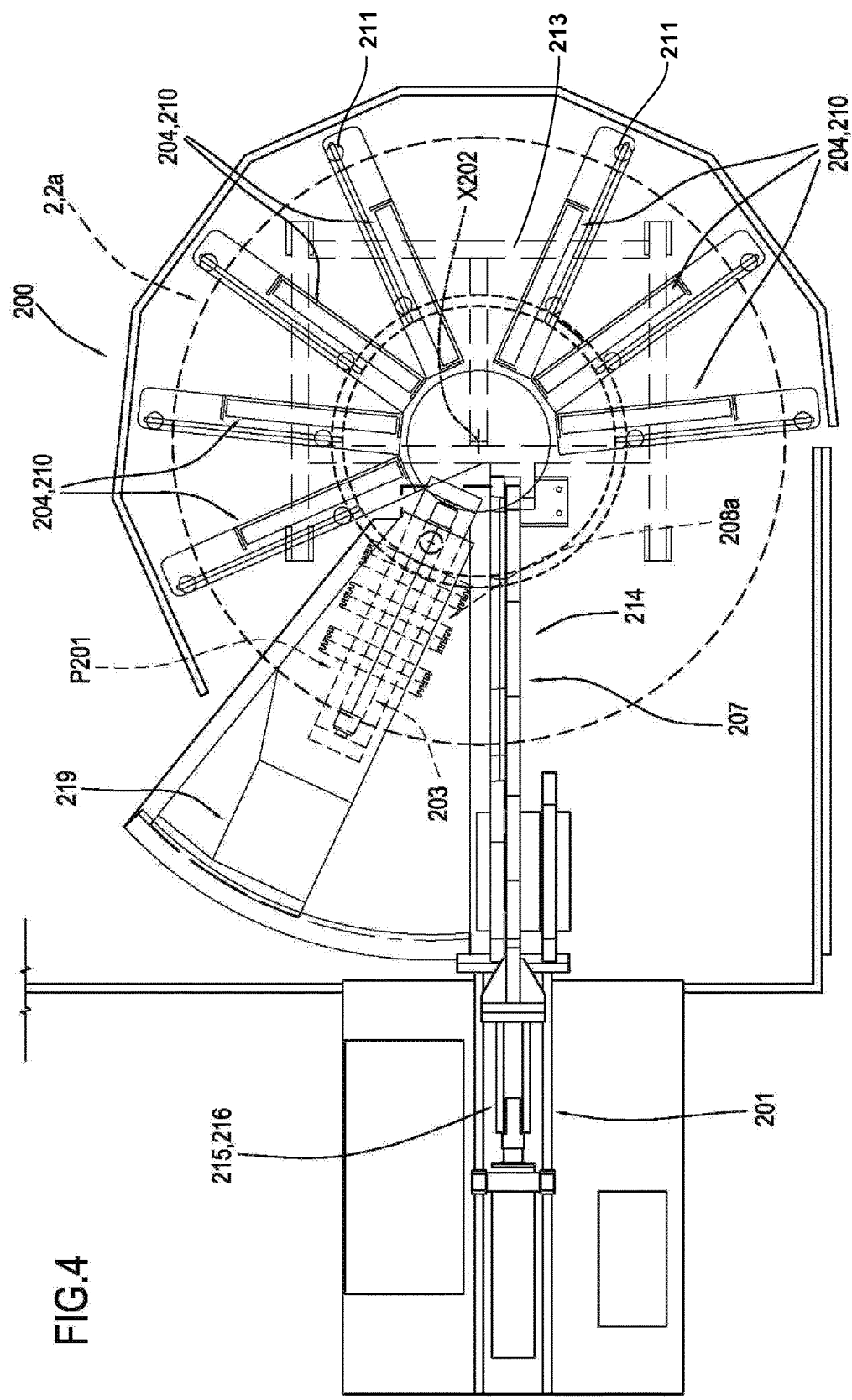
FIG. 4 illustrates a plan view of a detail of the machine that is the subject of the present invention according to a second configuration.

According to an embodiment of the invention, the machine 200 comprises a frame 201. Such a machine, as will be described in more detail below, may take up two configurations depending on the type of part (sidewall 2a, 2c or cap 2b) during treatment:
- a first configuration, illustrated in FIGS. 1, 2 and 3, when it is necessary to break down the cap 2b of a tire 2;
- a second configuration, illustrated in FIG. 4, when it is necessary to break down the sidewall (2a, 2c) of a tire 2.

The machine 200 comprises support means 204 against which said part (2a, 2b, 2c) of the tire rests.

In the example shown by way of non-limiting example, these support means 204 are formed by a plurality of rotary support members 210.

These rotary support members 210 are preferably rotary elements of the idler type or are mounted so as to be free to rotate.

Preferably, the rotary support members 210 are formed by rollers. It should be noted that, preferably, each rotary member 210 is formed by a roller that is configured to rotate about its own axis.

Figure 2:
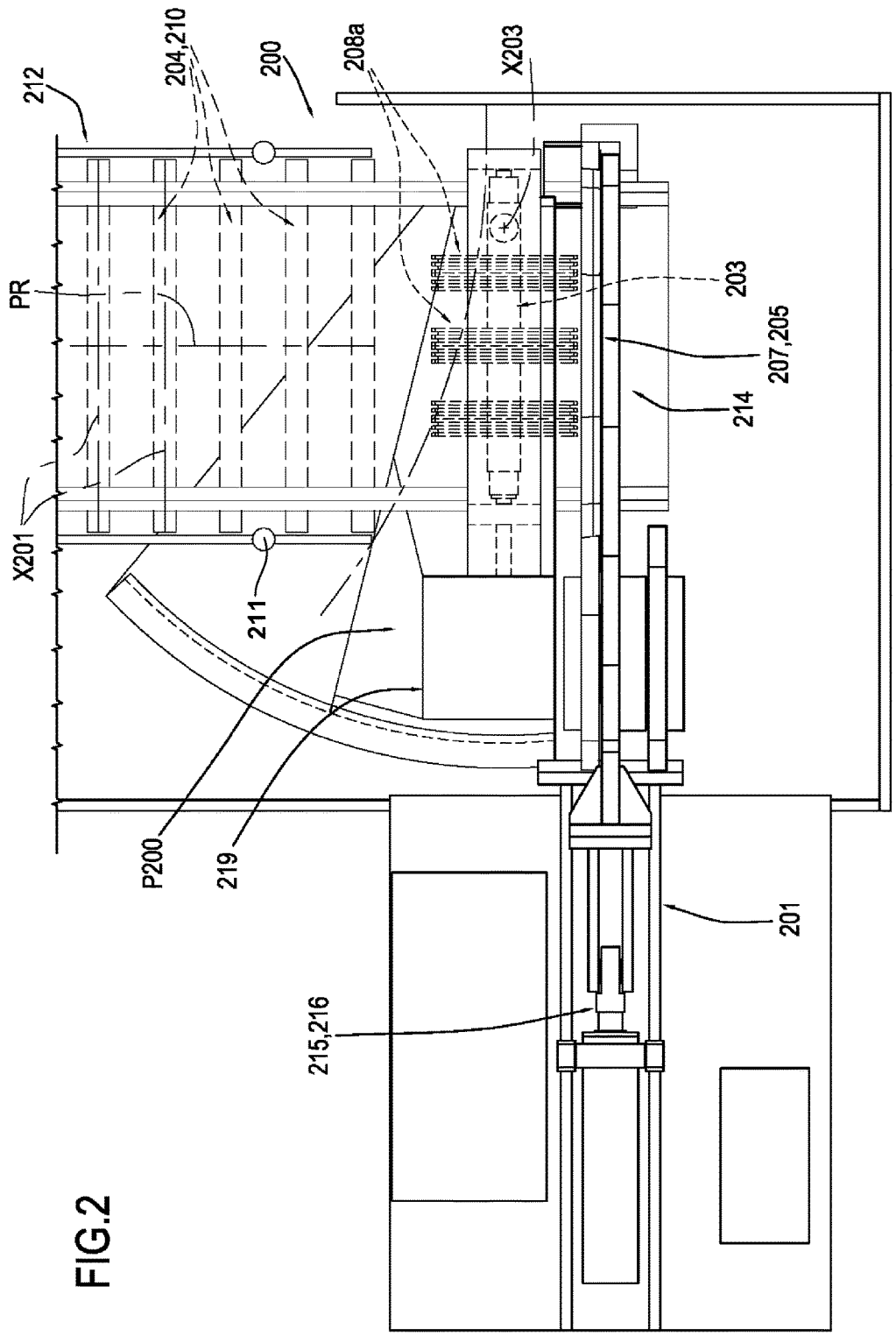
FIGS. 2 and 3 illustrate a plan view and a side view, respectively, of a detail of the machine that is the subject of the present invention according to a first configuration.

Referring to the example shown in FIG. 2 (first configuration), the machine 200 is configured with rotary members 210 disposed with substantially parallel axes X201.

Referring to this first configuration, it is noted that the rotary members 210 disposed with substantially parallel axes X201 define a rectilinear path PR for supplying the cap 2b of the tire 2.

These rotary members 210 are carried by a first support element 212.

Referring to the second configuration of the machine 200 (FIG. 4), the rotary support members 210 are disposed radially with respect to a (vertical) axis X202, in order to allow the rotation about said axis X202 of the sidewall (2a, 2c) of the tire 2 disposed in a manner resting against these rotary members 210.

These radially disposed rotary members 210 are carried by a second support element 213.

Preferably, the second support element 213 is removable with respect to the frame 201. This second support element 213 may also be equipped with rolling members, in order to allow the operator to move it easily and consequently to enable the configuration of the machine 200 to be modified.

The first support element 212 may also be removable with respect to the frame 201 in order to enable the configuration of the machine 200 to be changed by the operator.

The machine 200 comprises means 203 for supplying said part (2a, 2b, 2c) of the tire, said means 203 being configured to supply a cutting station 214 with parts of the tire to be broken down (the sidewall 2a, 2c or the cap 2b).

Preferably, the supplying means 203 comprise drive members (208a, 208b) that cooperate with one another in order to supply the cutting station 214 with parts of the tire to be broken down (the sidewall 2a, 2c or the cap 2b).

According to another aspect, the machine 200 comprises means 222 for adjusting the relative (vertical) position of said drive members (208a, 208b). These adjusting means 222 advantageously make it possible to adjust the position of the drive members depending on the dimensions (thickness) of the part (2a, 2b, 2c) of the tire during treatment.

According to the embodiment illustrated, the drive member 208a is able to move along a guide 223 in a vertical direction. Said drive member 208a is thus able to move between an end position for disengagement (FIG. 3) and another end position for engagement (FIG. 5) with the part (2a, 2b, 2c) of the tire 2 during treatment.

According to yet another aspect, the machine 200 comprises a plurality of other rotary members 211 that are disposed laterally with respect to said rotary support members 210 in order to laterally contain said part of the tire 2. These other rotary members 211 are preferably rollers of the type that are free to rotate.

Preferably, the machine 200 comprises means for adjusting the position of these rotary members 211 in order to allow their position to be adjusted depending on the dimensions of the part (2a, 2b, 2c) of the tire 2 during treatment.

The cutting station 214, which is part of the invention, comprises cutting means 205. The cutting means 205 comprise a first blade 205a and a second blade 205b that are pivotable in a hinged manner with respect to one another at a fulcrum 206 and cooperate with one another so as to define shears 207.

The first blade 205a and the second blade 205b are configured to rotate in a substantially vertical plane, that is to say to rotate about a horizontal axis.

The blade 205a is fixed to the frame 201 and the other blade 205b is able to move with respect to the frame 201.

The first blade 205a and the second blade 205b are shaped such that the cutting of said part 2a, 2b, 2c of the tire 2 starts at a distal end part of the blades 205a, 205b with respect to the fulcrum 206, or an end part of the blades 205a, 205b that is located away from the fulcrum 206. In other words, the tire part 2a, 2b, 2c is kept clamped between the blades 205a, 205b that are closed together and the distal end part of the blades 205a, 205b with respect to the fulcrum 206 first of all comes into contact, following the relative movement of the blades 205a, 205b moving towards one another, with the part (2a, 2b, 2c) of the tire 2 subjected to cutting. The blades (205a, 205b) are thus shaped such that the cutting of the tire progresses from their distal part with respect to the fulcrum 206 to their proximal part: this advantageously facilitates cutting and reduces the force necessary for cutting. Moreover, the distal end of the second blade 205b ends in a point which is made to slide in a guide that has a U-shaped cross section and is located at the distal end of the first blade 205a, specifically during its pivoting movement with respect to the first blade 205a. This pivoting guidance prevents the shears from opening under the cutting force and makes it possible to make a precise cut in the processed part of the tire.

The first blade 205a and the second blade 205b have a recessed or concave cutting shape defined by a continuous or broken curve.

Figure 5:
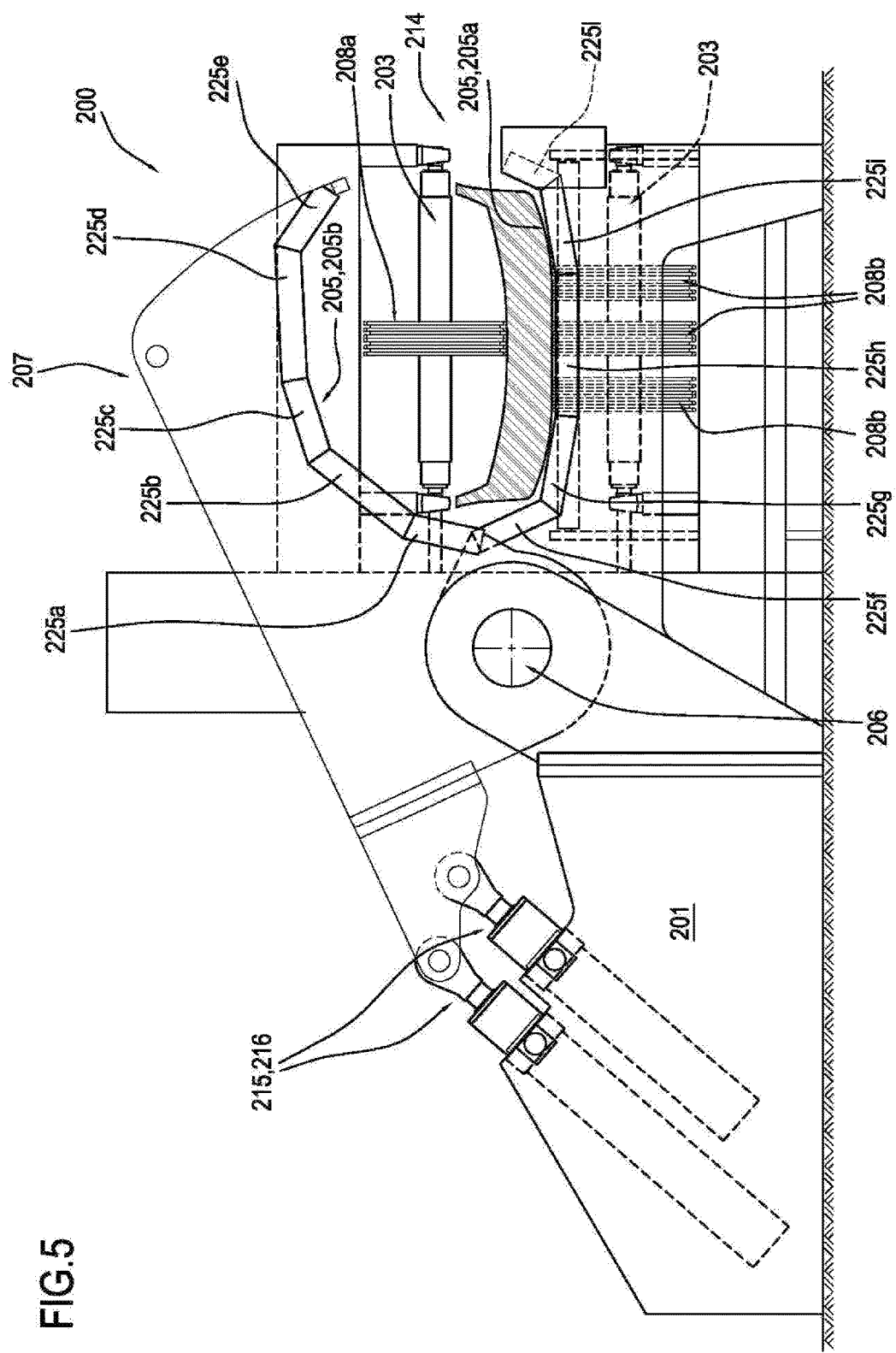
FIGS. 5 to 7 respectively illustrate corresponding side views of a detail of the machine shown in the preceding figures in different operating positions.

In the example in FIG. 5, the first blade 225a comprises five cutting edges, designated by the reference numerals 225f, 225g, 225h, 225i, 225l. The second blade 225b comprises five cutting edges, designated by the reference numerals 225a, 225b, 225c, 225d, 225e in FIG. 5. Compared with the central cutting edge of each blade (225h for the blade 205a and 225c for the blade 205b), the remaining cutting edges are at an inclination with respect to the cutting plane (namely the plane of the position of the cutting edges themselves and the plane of movement of the blade 205b), said inclination increasing with increasing distance from the central cutting edge itself.

Compared with the central cutting edge of each blade (225h for the blade 205a and 225c for the blade 205b), the proximal and distal cutting edges of each blade (225f and 225l for the blade 205a and 225a and 225e for the blade 205b, respectively) are at a greater inclination with respect to the cutting plane than that of the adjacent cutting edges (225*b* and 225*d* for the blade 205*b* and 225*g* and 225*i* for the blade 205*a*).

The cutting edges (225*f*, 225*g*, 225*h*, 225*i*, 225*l*; 225*a*, 225*b*, 225*c*, 225*d*, 225*e*) of each blade (205*a*; 205*b*) define a broken curve.

The disposition of the cutting means 205 means that cutting takes place in a particularly effective manner, avoiding sudden detachment of the cut-off piece, and avoiding any undesired stress being applied to the frame 201 of the machine 200 itself.

Figure 6:
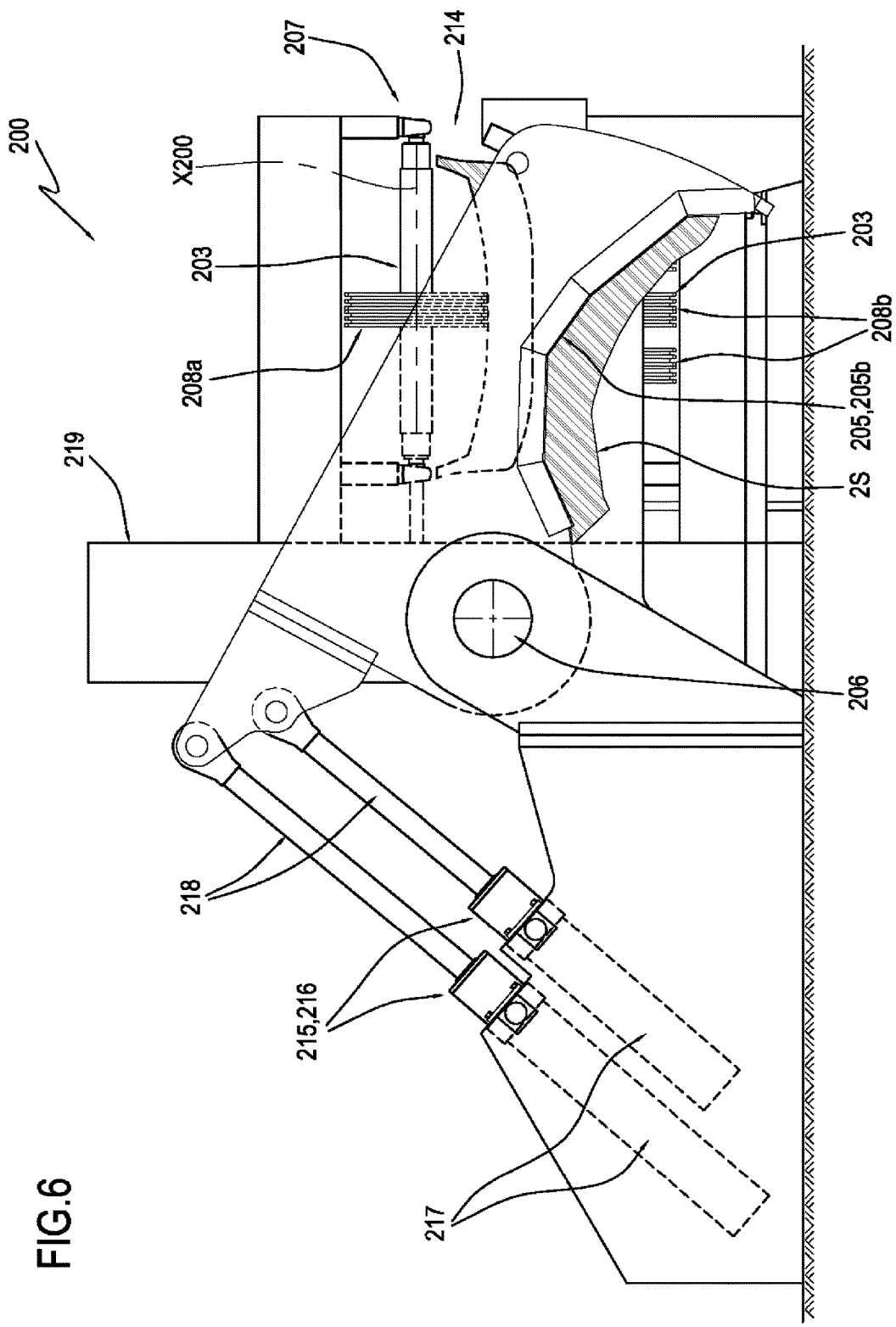
Figure 7:
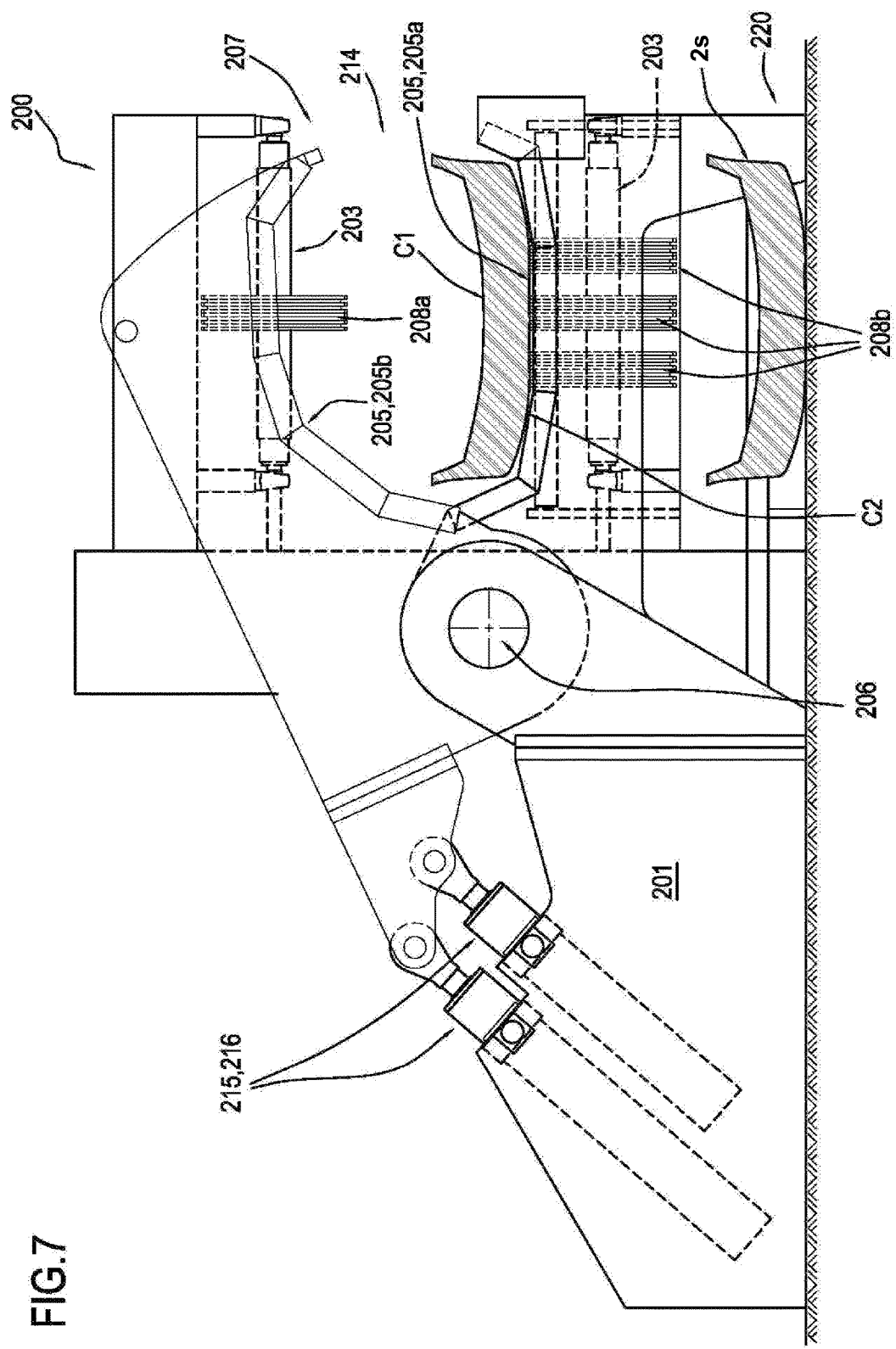

The cutting means 205 are manipulated by manipulation means 215. These manipulation means 215 act on the blades (205*a*, 205*b*) in order to move them between a rest end position, shown in FIGS. 5 and 6, and a close-up end position, which is achieved when the cutting of the part (2*a*, 2*b*, 2*c*) of the tire 2 has been fully carried out (see FIG. 6).

In particular, according to the embodiment described and illustrated, the manipulation means 215 comprise an actuator 216 interposed between the first blade 205*a* and the second blade 205*b*.

According to the example illustrated, one of the two blades (the first 205*a*) is fixed with respect to the frame 201 while the other of the two blades (the second 205*b*) is able to move.

The actuator 216 is preferably an actuator of the hydraulic type. In particular, this actuator 216 comprises a hydraulic cylinder 217 provided with a piston 218 that slides with respect to the cylinder 217; either the cylinder 217 or the piston 218 is fixed to the second blade 205*b* (so as to be pivotable in a hinged manner) and the other of these two components is fixed to the first blade 205*a* (so as to be pivotable in a hinged manner). Preferably, the actuator 216 comprises a pair of hydraulic cylinders 217 of the type described above.

According to an embodiment of the invention, the machine 200 comprises means 203 for supplying said part (2*a*, 2*b*, 2*c*) of the tire 2, said means 203 being configured to supply the cutting station 214 with parts (2*a*, 2*b*, 2*c*) of the tire 2. The supplying means 203 comprise drive members 208 that are configured to drive the part (2*a*, 2*b*, 2*c*) of the tire 2 in the direction of the cutting means 205.

These drive members 208 comprise rollers (208*a*, 208*b*) that cooperate with one another and act on opposite surfaces (C1, C2) of said part (2*a*, 2*b*, 2*c*) of the tire 2. According to the example illustrated, the machine 200 comprises an upper roller 208*a* and a plurality of lower rollers 208*b*.

The lower rollers 208*b* support the part of the tire 2 during processing and treatment, close to the cutting station 214. At least the roller (208*a*) which acts on one surface C1 of the part (2*a*, 2*b*, 2*c*) can be actuated with the aid of means 209*a* for driving in rotation. The other rollers (208*b*), which act on the other surface C2 of the tire, can also be actuated with the aid of means 209*b* for driving in rotation.

The means 209*a* and 209*b* for driving the rollers (208*a*, 208*b*) in rotation may comprise a motor, of the electric type.

The roller 208*a* that can be actuated with the aid of the drive means 209*a* is configured such that its position along the rotation axis X200 is adjustable: this advantageously makes it possible, during the treatment of the sidewall (2*a*, 2*c*), to center the roller 208*a* with respect to the mean circumference of the sidewall (2*a*, 2*c*) such that the driving action on the sidewall is optimal.

It should be noted that the drive members (208*a*, 208*b*) are associated with a unit 219 that is movable with respect to the frame 201 in order to be disposed in a first position P200, in which the machine 200 is in the first configuration, namely for treating the cap 2*b* of the tire 2, and in a second position P201, in which the machine 200 is in the second configuration, namely for treating the sidewall (2*a*, 2*c*) of the tire 2.

The movable unit 219 is pivotable in a hinged manner with respect to the frame 201 so as to be able to rotate between the abovementioned positions (P200, P201) about a vertical axis X203. The movable unit 219 rotates between the abovementioned positions P200 and P201 through an angle preferably of less than 45° and more preferably less than 30°: as a result of this rotation, the drive members (208*a*, 208*b*) are displaced in a horizontal plane.

Thus, when the machine 200 is in the first configuration, the movable unit 219 is in the position P200, with the drive rollers (208*a*, 208*b*) disposed with their axis substantially parallel to the support rollers 210. By contrast, when the machine 200 is in the second configuration, the movable unit 219 is in the second position P201, with the drive rollers (208*a*, 208*b*) disposed radially with respect to a common center X202.

In this way, when the drive members (208*a*, 208*b*) are in the first position P200, their rotation axis is substantially parallel to the vertical plane of movement of the second blade 205*b* (cutting plane); by contrast, when the drive members (208*a*, 208*b*) are in the second position P201, their rotation axis is in an inclined position with respect to the vertical plane of movement of the first blade 205*a* (cutting plane).

The operation of the machine of an embodiment of the invention will be described in the following text, referring in particular to the machine 200 shown in the appended figures and to the respective processing of a sidewall (2*a*, 2*c*) of the tire 2 or of a cap 2*b* of the same tire 2.

As has already been set out above, the machine 200 is configured in accordance with the second configuration when a sidewall (2*a*, 2*c*) of the tire 2 is treated.

The steel cord for reinforcing the beads which is embedded inside the heel of the tire and which forms a structural support for the tire 2 has previously been removed from the sidewall (2*a*, 2*c*) to be cut off.

In the second configuration, the machine comprises the second support element 213 for the rotary members 210 that are disposed radially with respect to an axis X202. The unit 219 is disposed in the second position P201 such that the drive members (208*a*, 208*b*) are disposed radially with respect to a common axis or center X202.

The sidewall (2*a*, 2*c*) is positioned so as to rest against the rotary support members 210, with a face of greatest planar extent disposed in a manner resting (horizontally) against the rotary support members 210.

In a variant, it is also possible to simultaneously process both sidewalls (2*a*, 2*c*) of the tire 2: in this case, a first sidewall 2*a* of the two sidewalls (2*a*, 2*c*) is disposed in a manner resting against the rotary support members 210 and the second sidewall 2*c* is superposed on the first such that the greatest planar extent of the second sidewall 2*c* is in contact with a face of the first sidewall 2*a*.

Once the sidewall has been positioned correctly on the rotary support members 210, the blades (205*a*, 205*b*) are actuated to carry out a first cut on the sidewall.

The actuation of the blades (205*a*, 205*b*) in order to cut off the sidewall (2*a*, 2*c*) is carried out by rotating the upper blade 205*a* so as to move it towards the lower blade 205*b*. This cut takes place substantially in a radial direction of the sidewall (2*a*, 2*c*).

The drive members 208, in particular the first member 208*a*, are driven in rotation so as to set the sidewall (2*a*, 2*c*)

in rotation with respect to the axis X202. This rotation of the sidewall (2a, 2c) with respect to the axis X202 means that the line along which the sidewall (2a, 2c) is cut off moves and a new sidewall part (2a, 2c), on which the second cut will be carried out, is disposed on the cutting line defined by the blades (205a, 205b) themselves.

The actuation of the blades (205a, 205b) towards their cutting position brings about a second cut in the sidewall (2a, 2c) of the tire 2.

Following the second cut, that part of the sidewall (designated by the expression "piece" in the present description) that is comprised between the first cutting line and the second cutting line is detached from the rest of the body of the sidewall itself.

In order to break the sidewall down into a multiplicity of pieces 2s, it is necessary to repeat the above-described cycle—of driving the sidewall in rotation and actuating the blades towards the cutting position—a number of times.

The pieces 2s of the sidewall (2a, 2c) drop into a collection zone 220 disposed beneath the cutting blades 205a and 205b.

Once the treatment is complete, the sidewall (2a, 2c) has been broken down entirely into radial pieces 2s.

Referring to the breaking down of the cap 2b into pieces 2s, the machine 200 is configured as per the first configuration.

FIG. 1 shows the cap 2b in section during the loading step. In this position, a first cut is made in the cap and subsequently the latter is stretched over the rotary members 210.

The machine 200 comprises the first support element 212, provided with rotary support members 210 having mutually parallel axes, and the movable unit 219 is disposed in the first position P200 such that the drive members 208 are disposed parallel to the rotary members 210.

The cap 2b, which has an annular shape with a substantially U-shaped section, is disposed in a manner resting against the rotary support members 210 in FIG. 1 such that a part of the external surface (or of the cap) rests against the rotary support members 210. A first cut is then made in the ring that forms the cap, so as to break down the ring itself. In this position, a first cut is made in the cap and subsequently the latter is stretched over the rotary members 210.

Following said cut or breaking down of the ring that defines the cap 2b, the cap is disposed on the rotary support members 210 so as to define a single rectilinear body 221 having a substantially "U"-shaped section, which extends longitudinally more or less in a direction at right angles to the axis of the rotary support members 210.

This single rectilinear body 221 is moved, by means of the drive rollers 208, along the rectilinear path PR defined by the support members 210 themselves. In this way, successive and consecutive parts of the rectilinear body 221 are brought to the cutting station 214 in order to be subjected to a cut.

In an analogous manner to what was described above with reference to a sidewall (2a, 2c), the cap part 2b between two successive cutting lines, that is to say a piece of cap, drops into the underlying collection zone 220.

Thus, with consecutive cycles of the rectilinear body 221 of the cap being moved in the direction of the cutting station 214 and the cutting blades (205a, 205b) being actuated, all of the rectilinear body 221 is broken down into pieces 2s.

In order to improve the cutting of the tire 2 and, in particular, the stability of the machine with respect to the ground during cutting, during which high cutting forces are produced, the blades (205a, 205b) are equipped with cutting edges (225f, 225g, 225h, 225i, 225l; 225a, 225b, 225c, 225d, 225e) having a serration or individual teeth (DT).

Figure 8:
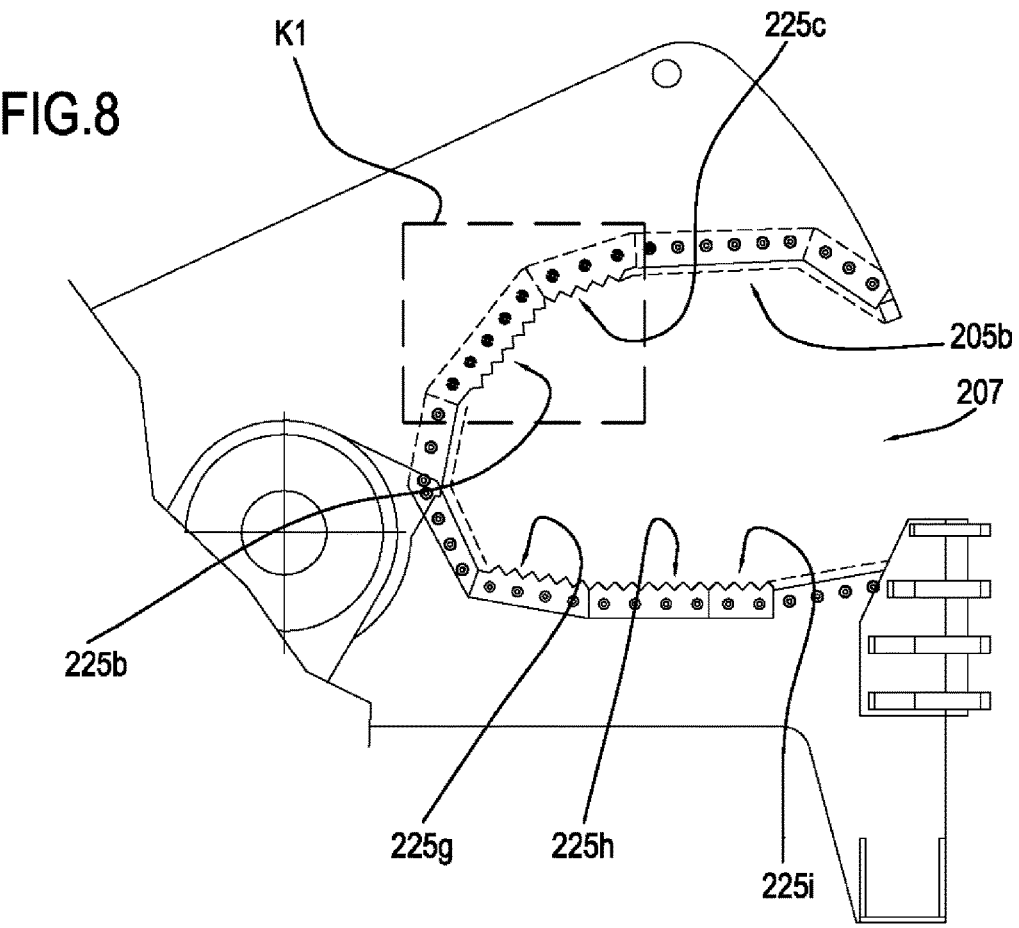
FIGS. 8 and 9 illustrate a variant of a detail of the machine shown in the preceding figures.
Figure 9:
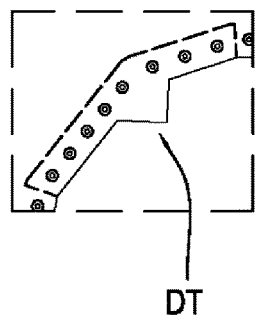

This serration or these individual teeth, which are clearly visible in FIGS. 8 and 9, make(s) it easier to cut the tire (sidewall or cap during treatment), by reducing the vibrations associated with cutting and the wear to the tools themselves.

For the sake of simplicity, only some of the cutting edges (225b, 225c, 225g, 225h, 225i) are shown in FIG. 8. In operation, the machine 200 preferably comprises cutting edges that define a serration extending along a broken curve.

Each cutting edge may have a serration that is substantially continuous or extends along the entire length of the cutting edge (FIG. 8), or only have a single tooth (DT), as is illustrated in FIG. 9, which shows a variant of the detail K1 in FIG. 8. Thus, some cutting edges may be provided with teeth or a serration, while it is possible for others not to have teeth or a serration (FIG. 10).

Figure 10:
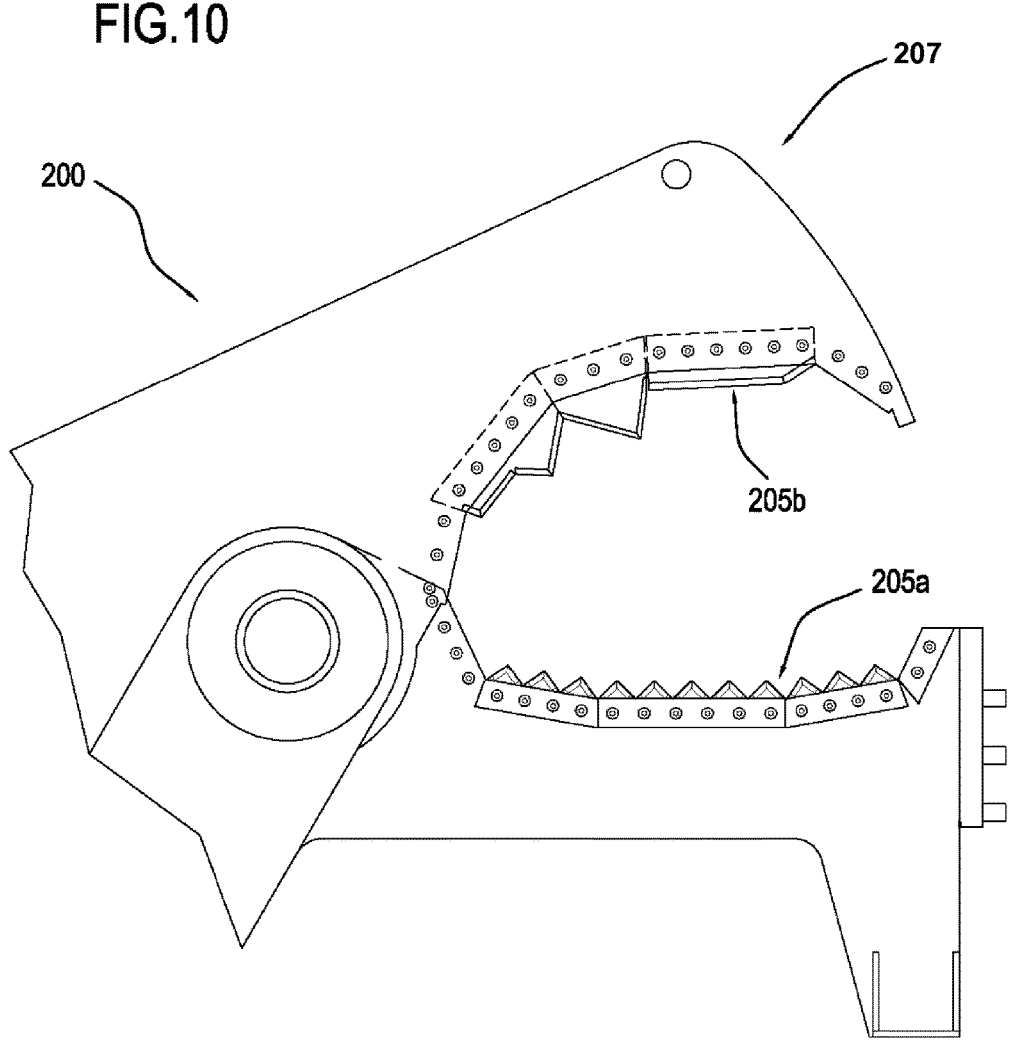
FIG. 10 illustrates another variant of a detail of the machine shown in the preceding figures.

According to the embodiment in FIG. 10, the movable blade 205b has cutting edges provided with teeth while the fixed blade 205a has cutting edges provided with serrations.

An advantage of this machine 200 is that, by virtue of its particular structure and the configuration of its constituent elements, it is capable of processing tires having particularly large dimensions and a particularly high mass.

Moreover, such a machine 200 is capable of rapidly and effectively processing both a sidewall and the cap of the tire 2, thereby making it possible to break these parts of the tire down into pieces to be subjected to a subsequent disposal treatment.

The present invention, in an embodiment, defines a method for breaking a part (2a, 2b, 2c) of a tire 2 down into pieces 2s, said part being formed by a sidewall (2a, 2c) or by a cap 2b of said tire 2. This method comprises the steps of:

disposing said part (2a, 2b, 2c) of the tire 2 in a manner resting against support means;

supplying cutting means 205 with parts (2a, 2b, 2c) of the tire resting against the support means;

cutting said part (2a, 2b, 2c) of the tire 2 with the aid of said cutting means 205 in order to break said part (2a, 2b, 2c) of the tire 2 down into pieces 2s.

The invention claimed is:

1. A machine for cutting a part of a tire down into pieces, comprising:

a frame;

a tire support for supporting said part of the tire;

a supplying device for supplying said part of the tire, said supplying device being configured to feed said part to a cutting station;

a cutting device, disposed at said cutting station, for cutting said part so as to cut the part down into pieces, the cutting device comprising a first blade and a second blade, at least one of said first and second blades being pivotable in a hinged manner with respect to the other of said first and second blades at a fulcrum and defining a cutting plane, said first blade and second blade being shaped such that the cutting of said part of the tire starts at a distal end part of the blades with respect to the fulcrum;

wherein at least one of the first and second blades has a concave shape and cooperates with the other of the first and second blades to keep said part of the tire to be cut inside of the blades; and wherein the supplying device includes a movable unit which can pivot about a vertical axis in a hinged manner between a first position for supplying a cap of the tire to the cutting station and a second position for supplying a sidewall of the tire to the cutting station;

wherein the movable unit includes rotatable drive members that rotate about a central axis thereof and that feed said part to the cutting device, wherein in the first position the central axis of the drive members is substantially parallel to a vertical plane of movement of said cutting plane and in the second position the central axis of the drive members is in an inclined position with respect to the vertical plane of movement of said cutting plane.

2. The machine according to claim 1, wherein one of said blades is fixed with respect to the frame while the other is able to move with respect to said frame.

3. The machine according to claim 1, wherein each blade comprises a plurality of cutting edges that are disposed so as to define a broken curve.

4. The machine according to claim 3, wherein, with respect to a central cutting edge, the cutting edges of each blade are at an inclination with respect to a cutting plane, said inclination increasing with increasing distance from said central cutting edge.

5. The machine according to claim 1, wherein said drive members act on opposite surfaces of said part of the tire.

6. The machine according to claim 5, further comprising a motor for driving at least one of said drive members in rotation.

7. The machine according to claim 1, wherein the tire support comprises a plurality of rotary support members.

8. The machine according to claim 7, wherein at least some of the rotary support members are disposed with a parallel axis, so as to define a rectilinear path for supplying the cutting device with part of the tire formed by the cap.

9. The machine according to claim 7, wherein at least some of the rotary support members are disposed radially with respect to an axis in order to allow a part of the tire formed by at least one sidewall of the tire to rotate about said axis.

10. The machine according to claim 7, further comprising a plurality of other rotary members that are disposed laterally with respect to the rotary support members in order to laterally contain said part of the tire.

11. The machine according to claim 7, further comprising a first support element for the plurality of rotary support members that are disposed with a parallel axis, in order to allow the cap of the tire to be supported, or a second support element for another plurality rotary support members that are disposed radially with respect to an axis, in order to allow at least one sidewall of the tire to be supported.

12. The machine according to claim 11, wherein said first support element or said second support element is configured to be removable with respect to said frame.

13. A method for cutting a part of a tire down into pieces, said part being formed by a sidewall or a cap of the tire, comprising:
disposing said part of the tire in a manner resting against the tire support,
supplying the cutting device with parts of the tire resting against the tire support;
cutting said part of the tire with said cutting device in order to cut said part of the tire down into pieces, wherein said step of cutting said part of the tire with said cutting device comprises a step of relative movement of a first blade that is pivotable in a hinged manner with respect to a second blade at a fulcrum and along a cutting plane and cooperates with said second blade so as to define shears, the blades of which are shaped so as to start cutting at a distal end part of the blades with respect to the fulcrum, wherein at least one of the first and second blades has a concave shape and cooperates with the other of the first and second blades to keep said part of the tire being cut inside of the blades; and
pivoting a movable unit of the supply device in a hinged manner about a vertical axis from a first position, wherein the supply device is configured to supply a cap of the tire to the cutting device, to a second position, wherein the supply device is configured to supply a sidewall of a tire to the cutting device;
wherein the movable unit includes rotatable drive members that rotate about a central axis thereof and that feed said part to the cutting device, wherein in the first position the central axis of the drive members is substantially parallel to a vertical plane of movement of said cutting plane and in the second position the central axis of the drive members is in an inclined position with respect to the vertical plane of movement of said cutting plane.

* * * * *